United States Patent [19]

Baker et al.

[11] 4,179,985
[45] Dec. 25, 1979

[54] SANDWICH COOKING AND ASSEMBLING UNIT

[75] Inventors: Edward D. Baker, San Francisco; Nils Lang-Ree, Los Altos; John S. Brown, Half Moon Bay, all of Calif.

[73] Assignee: NPI Corporation, Burlingame, Calif.

[21] Appl. No.: 952,631

[22] Filed: Oct. 19, 1978

[51] Int. Cl.² .................................... A47J 37/04
[52] U.S. Cl. .................................. 99/339; 99/352; 99/355; 99/357; 99/386; 99/443 C; 99/448; 99/467
[58] Field of Search ............... 99/339, 357, 448, 352, 99/355, 357, 386, 443 C, 467, 483

[56] References Cited

U.S. PATENT DOCUMENTS

| | | | |
|---|---|---|---|
| 2,225,176 | 12/1940 | Lewis | 99/339 X |
| 2,501,712 | 3/1950 | Chodziesner | 99/357 |
| 3,019,744 | 2/1962 | Carvel | 99/443 C |
| 3,266,442 | 8/1966 | Udall | 99/355 |
| 3,456,578 | 7/1969 | Pinsly | 99/339 |
| 3,580,164 | 5/1971 | Baker | 99/339 |
| 3,587,446 | 6/1971 | Gardner | 99/339 |
| 3,681,096 | 8/1972 | Philipe | 99/339 |
| 3,739,712 | 6/1973 | Dunning | 99/443 C |
| 3,815,489 | 6/1974 | Reid | 99/386 X |
| 3,987,718 | 10/1976 | Lang-Ree | 99/386 |

FOREIGN PATENT DOCUMENTS 1446941  8/1976  United Kingdom ............... 99/352

Primary Examiner—Billy J. Wilhite
Attorney, Agent, or Firm—Lothrop & West

[57] ABSTRACT

A cooking and assembly unit is primarily for use in the quantity production of sandwiches, such as hamburger sandwiches including a patty, a bun crown and a bun heel. The unit includes a storage compartment for a number of individual trays each carrying one or more bun heels or bun crowns. The storage compartment is related to a bun grill including a conveyor for trays carrying heels and another conveyor for trays carrying crowns. Both conveyors advance in a predetermined direction and deliver the heel trays and the crown trays to a downstream, exit end of the bun grill. From there the loaded trays are received on an entrance table at the upstream end of a product conditioning tunnel mounted on a straddle frame. The conditioning tunnel is heated and is supplied with steam to hold its contents in a selected atmosphere. A freezer compartment having an access opening to patties stored therein is disposed beneath the straddle frame and adjacent the entrance to the conditioning tunnel. Above the entrance to the product conditioning tunnel is a patty broiler having both its inlet and its exit on the upstream side of the patty broiler. Patties from the freezer compartment go through the broiler and are discharged to be assembled between a heel and a crown taken from the table at the entrance end of the product conditioning tunnel into which the so-assembled sandwiches are introduced. At the exit end of the product conditioning tunnel, a product makeup table is preferably disposed.

12 Claims, 5 Drawing Figures

SANDWICH COOKING AND ASSEMBLING UNIT

BRIEF SUMMARY OF THE INVENTION

To increase the efficiency of a fast food operation handling a substantial quantity of items such as hamburger patties disposed between bun heels and bun crowns, to get the product assembled quickly and into the hands of the ultimate customer in a short time, to conserve substantial amounts of energy consumed by the various heating and cooling units, and to reduce the floor space necessary for the operation, as well as for other reasons, there are provided devices for reserving the bun crowns and heels on trays, for browning the heels and crowns, for freeze-storing meat patties, for broiling such patties, for keeping an assembled sandwich of heel, patty and crown in good condition for an indeterminate period, and for final dressing of the sandwich with condiments and the like. Some of the units employed in the assembly are largely of relatively standard construction, but they are designed, positioned and adapted to accomplish the aims just set forth.

DETAILED DESCRIPTION

The mechanism of the invention is preferably used in a fast food establishment carrying a relatively high volume at peak hours, but the device is also capable of operating efficiently at off-peak hours when the volume is substantially less. Only a relatively small amount of floor space is necessary for the structures, all within easy working distance of a principal operator. The disposition of the various parts is such that the energy of each portion is relatively well conserved. Only one or a few, helping operators are requisite even for satisfactory maximum output.

Figure 1:
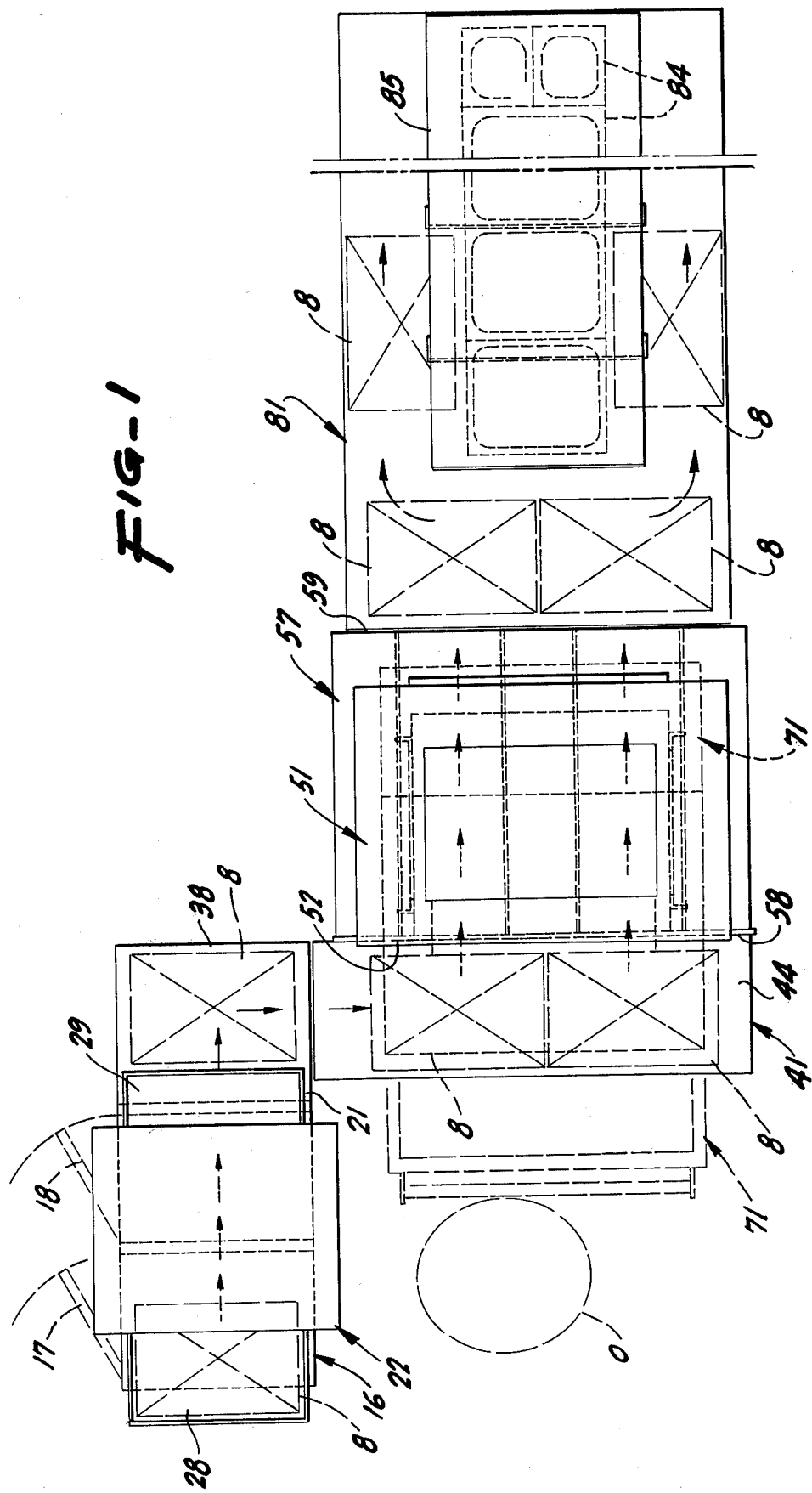
FIG. 1 is a plan of a sandwich cooking and assembling unit pursuant to the invention.
Figure 2:
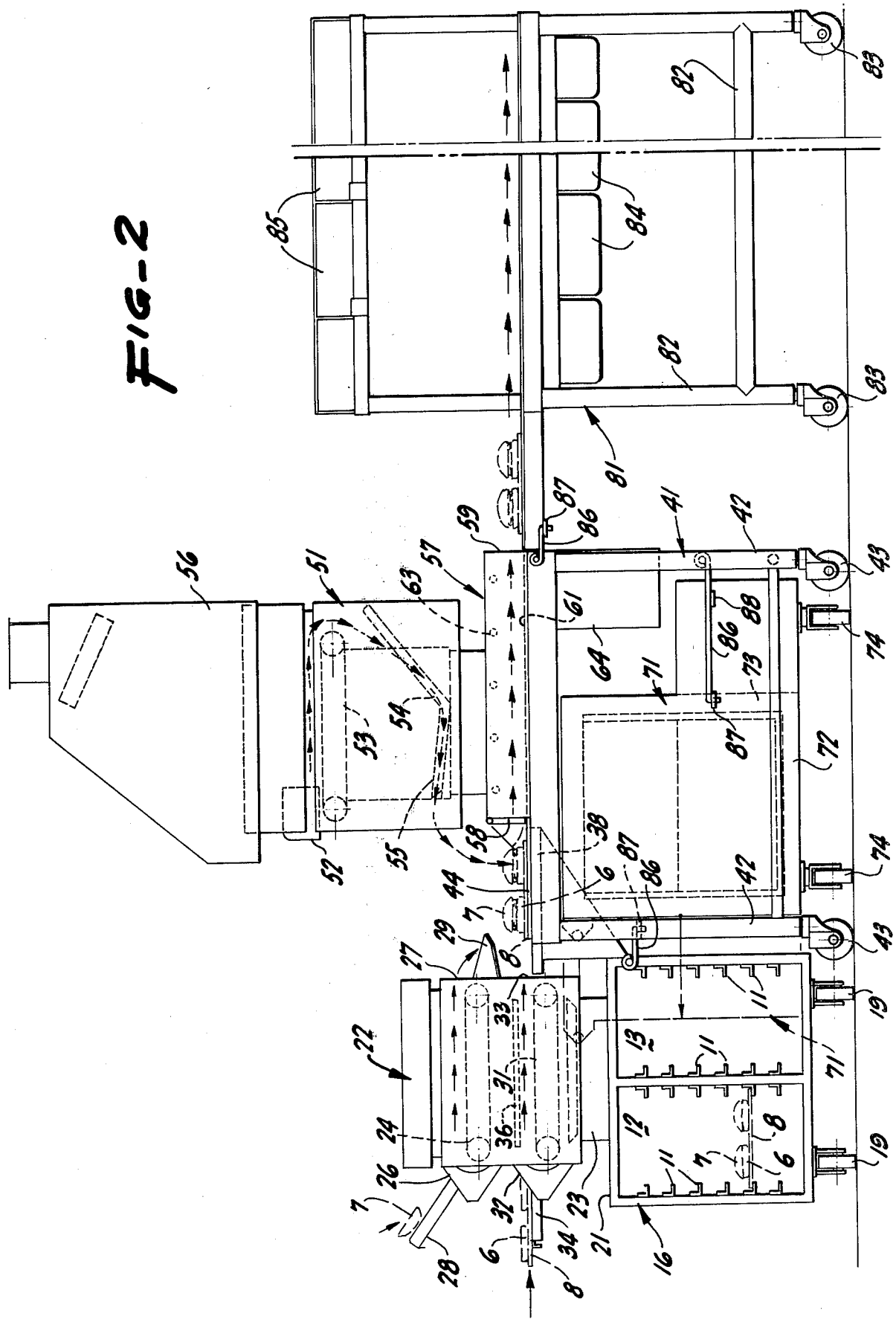
FIG. 2 is a side elevation of the mechanism shown in FIG. 1.
Figure 3:
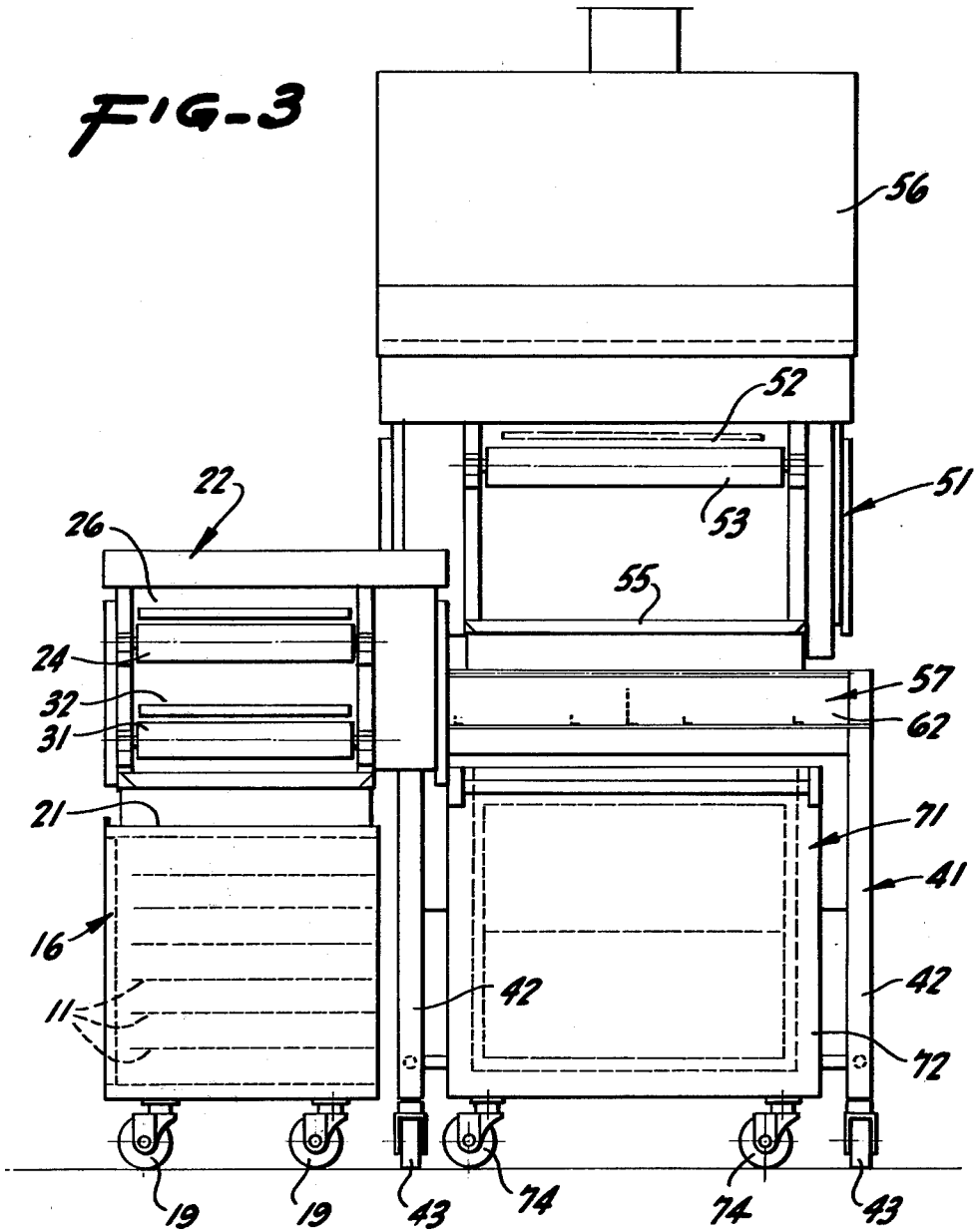
FIG. 3 is an end elevation from the upstream or feed end of the mechanism.

As particularly indicated in FIG. 2, the structure is primarily for use with a sandwich inclusive initially of a bun heel 6 and a bun crown 7. These usually are circular and are preferably predisposed in a predetermined number, such as six or eight of each kind, on a generally rectangular, light metal or plastic tray 8. A number of the trays provided with the paired heels and crowns are individually slid onto angle supports 11 arranged in sections 12 and 13 in a mobile storage compartment 16. The compartment is open at both sides and is provided with swinging doors 17 and 18 (FIG. 1) on one side only. When the doors are open there is clear access to the compartment interior from both sides, especially for loading from the far side; and when the doors are closed the interior of the compartment, while still open on one, near side, is protected against through drafts. The temperature and the freshness or humidity of the heels and crowns stored on trays therein can change only slowly.

The storage compartment 16 is mounted on wheels 19 with settable brakes so that the compartment can be moved to different locations for cleaning, refurbishing and the like, although for most operations the compartment occupies a set or fixed location.

Conveniently mounted on the top table 21 of the compartment 16 is a bun grill 22. This is a unit having its base 23 resting on or fastened to the top 21 so that the position of the bun broiler or grill 22 is normally fixed. Within the bun broiler are the customary heaters or platens and an upper, or crown, conveyor 24, of an endless nature, extending from an inlet 26 at the entrance upstream of the conveyor 24 to a discharge or exit opening 27 at the downstream end of the conveyor. The direction of advance of the conveyor is from left to right, as seen in FIG. 2. There is a crown feeding slide 28 at the entrance end and a crown receiving pan 29 at the exit end.

Within the bun grill and operating in parallelism with the conveyor 24 is a heel tray conveyor 31 operating from an entrance 32 at the upstream end to an exit 33 at the downstream end. There is a feeding shelf 34 at the entrance end capable of receiving a tray 8 with a plurality of heels 6 thereon, while the exit end 33 is adjacent a discharge table 38 at a predetermined elevation and of a sufficient area to receive a tray 8 with heels thereon.

Heels on the tray conveyor 31 preferably advance with their upper surfaces in engagement with a horizontal heated platen 36 in the bun grill 22.

Although described in connection with only a few buns and only a few trays, the entire structure may be of sufficient size to receive simultaneously a number of trays disposed side by side or end to end or both.

Arranged generally downstream and laterally of the storage compartment and of the bun grill is a straddle frame 41 having a number of legs 42 and generally open and unobstructed beneath the upper portion of the frame. The frame is mounted on locking wheels 43. Usually, these are locked but can be released so that the unit can be moved to a different location for cleaning and the like. The straddle frame 41 at its upstream or entrance end has a table 44 of sufficient area to accommodate a number of trays 8 and is preferably disposed at the same elevation or height as the table 38 and is arranged to be substantially a continuance thereof so that a tray on the table 38 can easily be slid onto the table 44.

Supported on the upper portion of the straddle frame 41 is a patty broiler 51 of generally standard construction adapted for the present use. There is a patty feed entrance 52 leading to a conveyor 53 adjacent a suitable broiler and having a patty discharge path 54 leading to a patty outlet opening 55 on the smae, upstream side of the broiler just under the patty feed opening 52. Conveniently, a hood 56 is disposed above the broiler to carry off any smoke therefrom.

Figure 4:
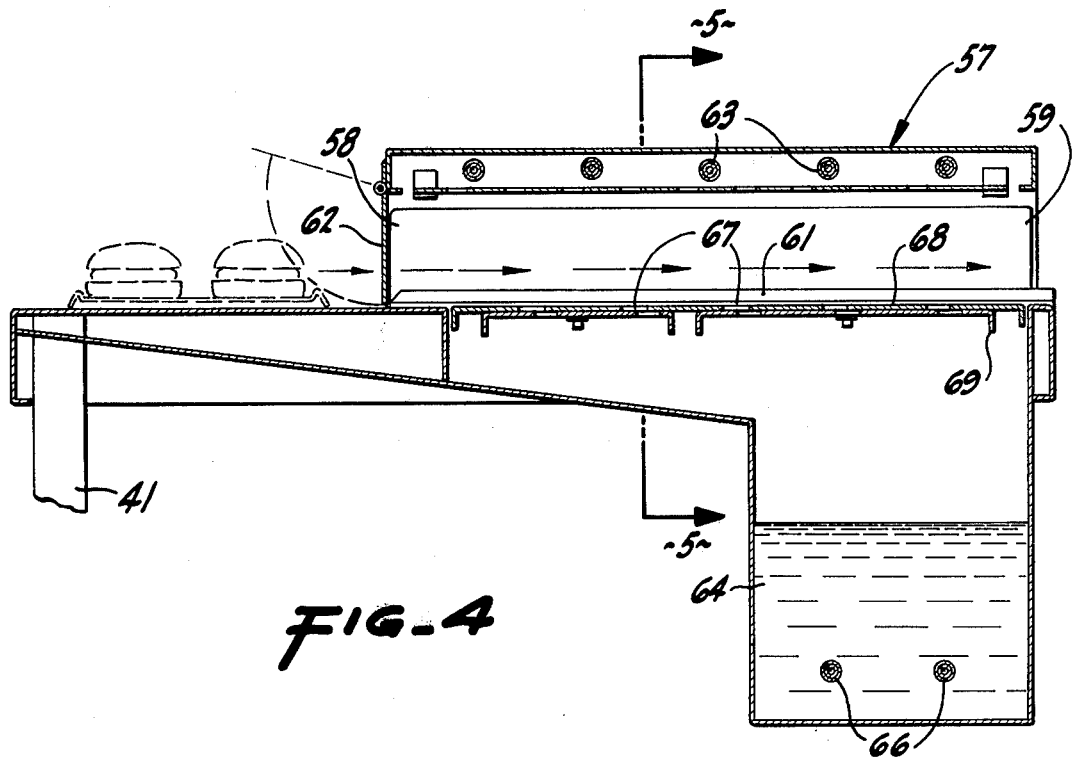
FIG. 4 is a longitudinal section on a vertical plane through a product conditioning tunnel and adjacent parts.
Figure 5:
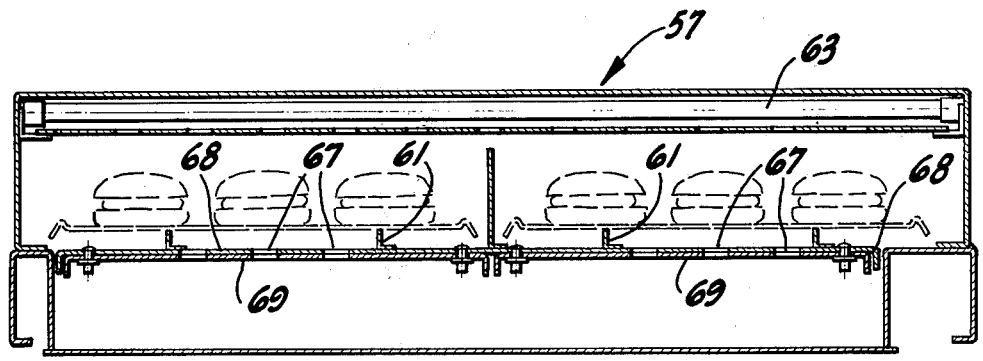
FIG. 5 is a transverse section on a vertical plane through the same structure as FIG. 4, the plane of section being on the line 5—5 of FIG. 4.

Mounted on the straddle frame 41, preferably beneath the patty broiler 51, is a product conditioning tunnel 57. This is shown in detail in FIGS. 4 and 5 and has an upstream entrance opening 58 and a downstream exit opening 59. The tunnel includes a bottom 61 along which trays 8 can be slid.

The entrance end of the tunnel is selectively closable by a hinged door panel 62 which can be manually raised but normally is left closed by gravity. The other end 59 of the tunnel 57 is preferably left open since the door 62, when closed, precludes through drafts. The interior of the tunnel is maintained at a predetermined condition partly by means of heater elements 63 therein and partly by a supply of water vapor or steam from a water compartment 64 on the frame 41 and having heater elements 66 therein. Steam rises and passes through openings 67 in floor plates 68. The size of the openings is changeable by sliding damper plates 69. The amount of steam directed into the product conditioning tunnel is controllable.

Conveniently housed beneath the straddle frame 41 is a freezer compartment 71 having its own frame 72 carrying a compressor unit 73 for the freezer mechanism. The frame 72 preferably is mounted on its own locking wheels 74. The unit is normally positioned about as shown, but can be withdrawn readily for servicing, cleaning and the like.

As an option and depending upon the installation requirements and architecture, it is also convenient to have disposed on the downstream end of the product conditioning tunnel 57 an assembly table 81 at the same height or elevation. This has its own frame 82 supported from the floor on locking wheels 83 and contains pans 84 for condiments, dressings and the like. There are upper shelves 85 for paper napkins, straws or comparable items.

The various units described herein are generally illustrated as being movable and separable. They are most often in practice connected together in a single assembly. That is diagrammatically illustrated herein by fasteners 86 on various of the units in the form of hooks engageable with eyes 87 or hasps on the adjacent units. If desired, many of the units can be permanently inseparable, although servicing is then somewhat more difficult.

In the general operation of this structure, the storage compartment 16 is initially loaded with trays 8 containing bun heels 6 and bun crowns 7. These foods are available for immediate use, usually in groups of six or eight. The operating freezer compartment 71 is supplied or packed with meat patties or the like in any desired quantity, maintained ready for use at a desired low temperature, usually below freezing. The heaters and conveyors are energized.

All of the units are supplied and in working order. An operator 0 (FIG. 1) standing near the open side of the bun storage compartment 16 moves the freezer compartment partly out from under the frame 41 after releasing the hooks 86. He then reinserts the hooks in second eyes 88 so that the open top of the freezer compartment is partly unobstructed and the interior is available for him to reach in. He withdraws a tray 8 from the compartment 16 and puts it on the shelf 34. He then lifts off the crowns and starts them individually or in multiple on the feed slide 28 of the crown browner 24 and starts the tray 8 carrying the bun heels through the browner on the heel tray conveyor 31.

When the tray emerges from the bun browner it rests on the table 38. The operator previously has reached into the open top freezer compartment 71 and has withdrawn patties therefrom. He has introduced the frozen patties into the entrance 52 of the patty broiler 51. He withdraws cooked patties from the exit opening 55 of the patty broiler and puts them on the exposed heels carried by the tray 8 on the table 38 or on a tray 8 he has already advanced to the table 44 in the broiler location. He then takes crowns from the receiving pan 29 and places them on top of the patties on the heels on the tray.

The door 62 to the product conditioning tunnel 57 is temporarily lifted, and the tray 8 with the bun heels, patties and crowns temporarily assembled as sandwiches thereon is introduced into the tunnel 57. The sandwiches can remain in the tunnel an indefinite time, being maintained in an appropriate, moist, warm condition for a long interval. After each of several subsequent trays is inserted into the product conditioning tunnel, the door 62 is permitted to close.

When there is a demand for the sandwich product, a tray with assembled heels, crowns and patties is withdrawn from the tunnel 57 through the open discharge end 59 and is advanced along the table 81 of the assembly unit. The auxiliary workers there then reassemble the sandwiches with appropriate condiments, dressings and the like and discharge them on trays or separately from the far end thereof to the customers.

We claim:

1. A sandwich cooking and assembling unit comprising a storage compartment for a tray carrying a bun heel and a bun crown, a bun grill disposed directly above said storage compartment and including a tray conveyor and a crown conveyor both advancing in a predetermined direction from an upstream end to a downstream end, a product conditioning tunnel having an entrance table at an upstream entrance and having an exit at a downstream end, means including a straddle frame for supporting said product conditioning tunnel with said table substantially even with and adjacent said downstream end, a freezer compartment having an access opening thereto and disposed beneath said straddle frame with said access opening adjacent said storage compartment, and a patty broiler including an inlet and an exit both on the upstream end of said patty broiler and arranged on and directly above said product conditioning tunnel.

2. A device as in claim 1 including an assembly table disposed at the downstream end of said tunnel.

3. A device as in claim 1 in which said storage compartment is a pass-through chamber open on both sides, and doors on said compartment movable into and out of position to close one side of said chamber.

4. A device as in claim 1 in which said bun grill has a horizontal heated platen above said tray conveyor at a predetermined vertical distance, and said distance is selected such as to cause a bun heel on a tray on said conveyor frictionally to engage said platen.

5. A device as in claim 1 in which said freezer compartment has an open top and is movable in said predetermined direction between a closed position with said open top beneath and covered by said tunnel and an open position with said open top away from and uncovered by said tunnel.

6. A device as in claim 1 in which said exit of said patty broiler and the downstream end of said bun grill and the entrance of said tunnel are in unobstructed direct reach of each other.

7. A device as in claim 1 in which said tunnel includes means for supplying said tunnel interior with steam.

8. A device as in claim 1 in which said tunnel includes means for supplying said tunnel interior with heat.

9. A device as in claim 1 in which said tunnel is a pass-through chamber open at both said entrance and said exit, and a door on said tunnel movable into and out of position to close one end of said chamber.

10. A device as in claim 1 in which said straddle frame includes a table supported from the floor on legs leaving an open volume under said table, and said volume is sufficient to receive said freezer compartment beneath said table.

11. A device as in claim 1 in which said product conditioning tunnel has a top area of sufficient extent to support said patty broiler thereon.

12. A device as in claim 1 in which said tray conveyor and said product conditioning tunnel are of substantially the same height.

* * * * *